Nov. 1, 1960     J. G. KYPER     2,958,152
ARTIFICIAL FISH LURE
Filed Sept. 10, 1958
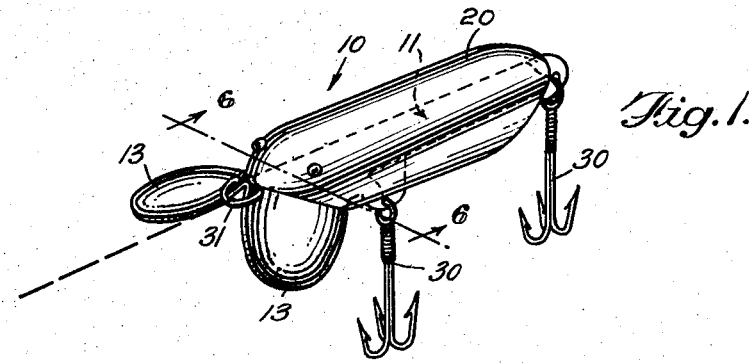
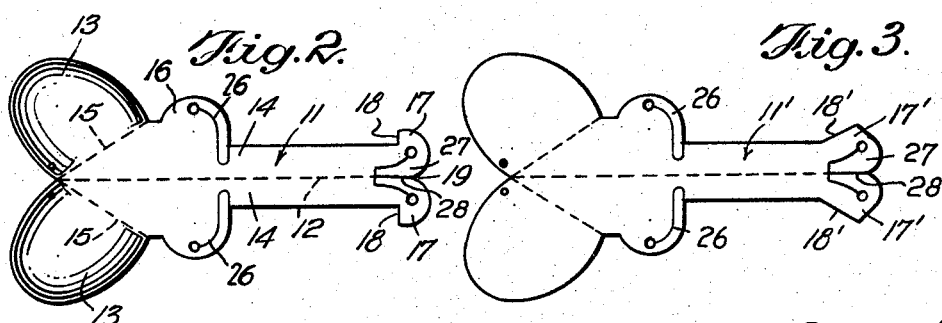
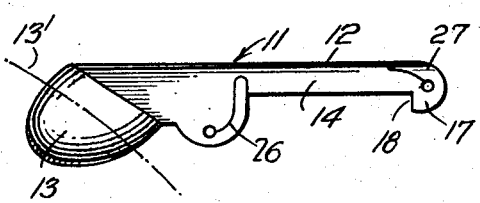 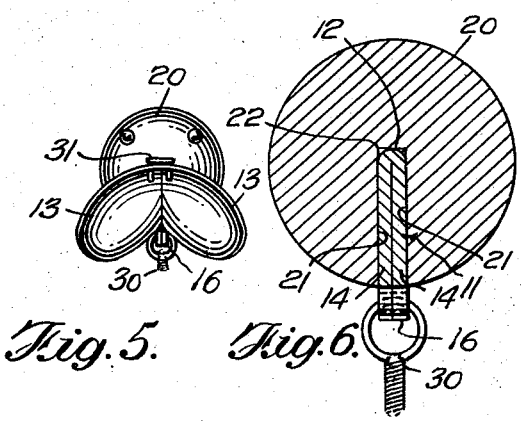
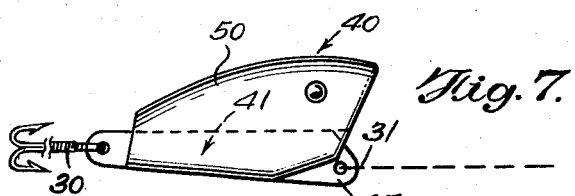
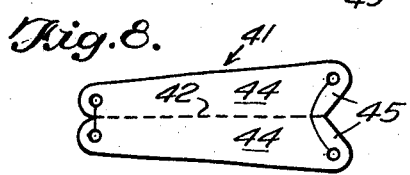
Inventor
James G. Kyper,
By Karl W. Flocks
Attorney.

2,958,152
ARTIFICIAL FISH LURE

James G. Kyper, Warriors Oaks, P.O. Box 355, Huntingdon, Pa.

Filed Sept. 10, 1958, Ser. No. 760,124

6 Claims. (Cl. 43—42.47)

The present invention relates to an artificial fish lure, and more particularly to such a lure that has a frame on which interchangeable bodies are frictionally mounted and held, the frame having integral spoons which serve to emit a fish-attracting gurgling sound.

When fishing with artificial lures, the fisherman often desries to change the lure he is using in the event he is not enjoying success with it. One solution to this problem is the changing from one lure to another, but it will be understood that this involves an undesirable changing of the entire lure, i.e., removing it from the line and replacing it with another lure.

To overcome the above noted deficiencies, there have been proposed fish lures in which a frame or main part has a removable body, so that different bodies may be interchanged on the frame while the frame remains secured to the line. However, this solution has not been entirely satisfactory because there has been provided on the known fish lures of this type various catches or latching devices which offset to some degree the advantage to be obtained by the interchangeable body concept.

Also, prior art fish lures involving the use of interchangeable bodies has been made by materials and processes that were inherently expensive, relatively speaking, so that the cost of the final product was undesirably high.

In addition, in order to most favorably attract fish resort has been made to sound emitting lures, but these types of lures have not proven altogether satisfactory in their ability to attract fish.

An object of the present invention is to provide an artificial fish lure so constructed as to receive various interchangeable bodies.

Another object of the present invention is the provision of an artificial fish lure in which interchangeable bodies may be placed on and removed therefrom without resorting to a latch or lock.

Another object of the present invention is to provide an artificial fish lure in which a fish-attracting sound or noise is emitted by the lure.

A still further object of the present invention is the provision of an artificial fish lure having interchangeable bodies and which will emit substantially the same noise regardless of what body is used.

Yet another object of the present invention is to provide an artificial fish lure which is held substantially at the surface of the water by hydrodynamic forces acting on the lure.

Another object of the present invention is the provision of a fish lure capable of having various bodies applied thereto, the lure being made of inexpensive parts and by an inexpensive process.

Yet another object of the present invention is to provide a fish lure that will have an attractive and tantalizing wobbling action.

Other objects and the nature and advantages of the instant invention will be apparent from the following descripton taken in conjunction with the accompanying drawings, wherein:

Fig. 1 is a perspective view of an embodiment of a fish lure in accordance with the present invention.

Fig. 2 is a plan view of a blank for the frame of the fish lure of the present invention.

Fig. 3 is a plan view of another blank in accordance with the present invention.

Fig. 4 is a side view of the frame of Fig. 1.

Fig. 5 is an end view of the lure of Fig. 1.

Fig. 6 is an enlarged cross-sectional view taken on the line 6—6 of Fig. 1.

Fig. 7 is an elevational view of another embodiment of the fish lure of the present invention.

Fig. 8 is a plan view of the blank of the plane used in the lure of Fig. 7.

Referring now to the drawings, wherein like reference numerals are used to designate like or corresponding parts through the several views, there is shown in Fig. 1 a lure 10 comprising a frame 11 of sheet metal having an interchangeable body 20 thereon.

Referring now to Fig. 2, there is shown the frame 11 as it appears after having been stamped or otherwise cut from a sheet of metal. The frame 11 has indicated thereon a longitudinally extending fold line 12, and it may be seen that the frame 11 is symmetrical about the fold line 12. On each side of fold line 12 there is a spoon area 13 that is separated from the longitudinally extending side part 14 by a fold line 15. Fold line 15 is inclined with respect to fold line 12, as shown.

Also extending from the side part 14, just rearwardly of the spoon area 13 is a hook support area 16 that is roughly semi-circular in shape and has a stamp sheared section 26 terminating in a hole, said stamp sheared section serving as a securing means for the rigid eye of the hook.

At the rear of the frame 11 is a second hook support area 17 having stamped sheared hook securing section 27 terminating in a hole, and a leading edge 18 that is substantially perpendicular to the fold line 12. The rear of the frame 11 has a rounded V-cut 19 that partially defines the rear hook support area 17; the sections 27 are separated by a slit 28.

In Fig. 3, the forepart of the frame 11' is generally similar to the frame 11 shown in Fig. 2, but the rear hook support area 17' thereof has a rearwardly angled leading edge 18'.

In Fig. 4, there may be seen the frame 11 bent into its final form, with the fold line 12 at the top thereof and the hook support area 16 extending downwardly from the side part 14. The spoon 13 may be seen to be curved about a longitudinally extending rearwardly curved and depressed axis 13', and the axes about which the two spoons 13 are bent are substantially parallel. There may also be seen the leading edge 18 that is substantially perpendicular to the fold line 12.

In Fig. 5, there is shown the body 20 mounted on the frame 11, this view showing the configuration from the front of the spoon 13 and the support areas 16 that serve to support the hook 30. A bail 31 is pivotally attached to the frame 11 by means of holes in the spoons 13 slightly forward of the fold line 15 (see Fig. 2).

As above noted, the frame 11 is made of metal, and has the quality of being somewhat resilient. As may be seen in Fig. 6, the frame 11 has the side parts 14 thereof in generally parallel relationship and extending downwardly from the fold line 12. The outer surfaces of the side parts 14 resiliently press against and frictionally engage the walls 21 that define a slot in the body 20, the slot being longitudinal and extending upwardly from the bottom of the body 20. A further wall 22 at generally right angles to the wall 21 defines the top of the slot.

In Fig. 7, there is shown a greatly simplified construction of a lure in accordance with the present invention, and there may be seen therein a lure 40 having a frame 41 and a body 50. As before, a bail 31 is directly attached to the frame 41, and the line is attached to the bail 31.

In Fig. 8, there is seen the blank of the frame 41, frame 41 having side parts 44 that are separated by a fold line 42. There may also be seen forwardly and outwardly pointing triangular areas 45 having holes therethrough for the reception of the bail 31.

Referring again to Fig. 7, it may be seen that when the frame 41 is folded about the fold line 42, the triangular areas 45 provide an outward and downward extension and thus provide adequate space for the attachment of the bail 31.

Referring again to Fig. 8, it may be seen the outer edges of the side parts 44 are inwardly rearwardly directed, thus providing for economy of material in the manufacture of the blanks for the frame 41. It will be understood that when the blank of Fig. 8 is folded and the body 50 placed thereon the action is substantially the same as that of the body 20 on the frame 11, as illustrated in Fig. 6 and described above.

The lure of the present invention is used in the normal manner. When it is pulled through the water, the embodiment shown in Fig. 1 will have a wobbling action due to the hydrodynamic forces acting on the lure 10 and particularly on the spoons 13. Due to the concavity of the spoons and their inclination (about axis 13') there will be resultant lifting force. Due to the lack of a stabilizing force, combined with the small and inherent variations in the spoons about a vertical plane, the entire lure will have a rolling oscillation. In addition, because of the flow of the water downwardly under the trailing edges of the spoons 13, there will be a gurgling sound emitted, and particularly so due to the intermittent entrapment of air by the forward part or leading edge of the spoon 13. Thus, as the lure 10 is drawn through the water it will oscillate about the longitudinal axis and will emit a gurgling sound; also, the water will not flow under the trailing edge of the spoon in a steady manner so that more and less lift will be intermittently applied to the spoon and thus give to the entire lure 10 a bobbing action. These actions and the noise emitted will serve to tantalize and entice the fish, so that extremely good results are obtained with the lure shown in Fig. 1.

When it is desired to change the body 20, it is only necessary to grasp the frame 11 with one hand in a manner so as to avoid the hooks 30 and to grasp the body 20 in the other hand and to separate the hands in order to separate the body 20 from the frame 11. Thereafter, by reversing the operation another body may be placed on the frame 11 and fishing recommenced with a minimum wastage of time, with a minimum of effort, and without the necessity of engaging and disengaging small latch members.

With the lure of Fig. 7, the changing of the body 40 may be accomplished in a facile manner, like the changing of body 20.

By bending the securing sections 26 and 27 to one side, the eye of a hook may be placed thereon to thus attach the hook without screws or other attaching means. As may be seen from Fig. 7, the hook may be retained in a horizontal plane by spring action with the individual hooks extending upwardly. This prevents the hooking of weeds, etc.

It will be seen that there has been provided an artificial fish lure that has a configuration that results in an irregular motion through the water that produces a distinctively audible, gurgling sound which attracts and lures fish, and which has a wobbling movement that produces a tantalizing flash from the alternate side to side motion. Also, the lure of the present invention may be seen to be extremely simple in construction and readily made by simple and known techniques. Bodies are interchangeable readily, without the necessity of handling small latching parts.

It will be obvious to those skilled in the art that various changes may be made without departing from the spirit of the invention and therefore the invention is not limited to what is shown in the drawings and described in the specification but only as indicated in the appended claims.

What is claimed is:

1. A fish lure comprising a frame of resilient sheet metal comprising longitudinally extending substantially parellel side parts integrally and resiliently joined along a longitudinally extending fold line, said fold line being uppermost, a lure body having walls defining a longitudinal slot therein extending upwardly from the bottom thereof, the said side parts resiliently pressing against and frictionally engaging the walls within said slot, a first gurgle-emitting and wobble producing spoon integral with one of said side parts and extending from a fold line adjacent the front thereof, a second gurgle-emitting and wobble producing spoon integral with the other side part and extending from a fold line adjacent the front thereof, said spoons being curved about longitudinally extending substantially equally rearwardly curved and depressed axes and each curving upwardly, outwardly and downwardly about its respective axis from said latter mentioned fold line, hook supports extending from the bottom of said parts having hook means attached thereto, said frame extending forwardly of the front part of said body and having a bail pivotally secured thereto.

2. A fish lure comprising a frame of resilient sheet metal comprising longitudinally extending substantially parallel side parts integrally and resiliently joined by a longitudinally extending fold line, said fold line being uppermost, a lure body having walls defining a longitudinal slot therein extending upwardly from the bottom thereof, the said side parts resiliently pressing against and frictionally engaging the walls within said slot, a first gurgle-emitting and wobble producing spoon integral with one of said side parts and extending from adjacent the front thereof, a second gurgle-emitting and wobble producing spoon integral with the other side part and extending from a fold line adjacent the front thereof, said spoons being curved about longitudinally extending substantially equally rearwardly depressed axes and each curving upwardly, outwardly and downwardly about its respective axis from said latter mentioned fold line, hook supports extending from the bottom of said parts having hook means attached thereto, said frame extending forwardly of the front part of said body and having a bail pivotally secured thereto.

3. A fish lure comprising a frame of resilient sheet metal comprising longitudinally extending substantially parallel side parts integrally and resiliently joined by a longitudinally extending fold line, a lure body having walls defining a longitudinal slot therein extending upwardly from the bottom thereof, the said side parts resiliently pressing against and frictionally engaging the walls within said slot, a first gurgle-emitting and wobble producing spoon integral with one of said side parts and extending from adjacent the front thereof, a second gurgle-emitting and wobble producing spoon integral with the other side part and extending from a fold line adjacent the front thereof, said spoons being curved about longitudinally extending rearwardly depressed axes and each curving upwardly, outwardly and downwardly about its respective axis, hook supports extending from the bottom of said parts having hook means attached thereto, said frame extending forwardly of the front part of said body and having a bail pivotally secured thereto.

4. A fish lure comprising a frame of resilient sheet metal comprising longitudinally extending substantially parallel side parts integrally and resiliently joined by a longitudinally extending fold line, a lure body having walls defining a longitudinal slot therein extending upwardly from the bottom thereof, the said side parts resiliently pressing against and frictionally engaging the walls within said slot, a first gurgle-emitting and wobble producing spoon integral with one of said side parts and extending from a fold line adjacent the front thereof, a second gurgle-emitting and wobble producing spoon integral with the other side part and extending from another fold line adjacent the front thereof, said spoons being curved about longitudinally extending rearwardly depressed axes and each curving upwardly, outwardly and downwardly about its respective axis, and hook supports extending from the bottom of said parts having hook means attached thereto.

5. A fish lure as set forth in claim 4; one of said hook supports comprising portions of said side parts including a hook-forming support portion comprising alignable apertures extending transversely through a portion thereof spaced from said fold line, said apertures communicating with slit portions extending toward said fold line and communicating with the outer margin of said frame, said slit portions forming a laterally displaceable tab for receiving the rigid eye of a hook thereover, said displaceable tab being received within the longitudinal slot of said lure body when it is disposed on said frame.

6. A fish lure as set forth in claim 4; said hook supports comprising longitudinally spaced portions of said side parts disposed intermediately of and at one end of said side parts and including alignable apertures extending transversely through said side parts and spaced from said fold line, said apertures communicating with slit portions extending toward said longitudinal fold line and communicating with the outer margin of said frame, said slit portions forming a laterally displaceable tab intermediately of and at one end of said support frame for receiving the rigid eye of a hook thereover, said displaceable tabs being received within the longitudinal slot of said lure body when it is disposed on said frame.

References Cited in the file of this patent
UNITED STATES PATENTS

| | | |
|---|---|---|
| 1,133,669 | Reynolds | Mar. 30, 1915 |
| 1,345,600 | Keeling | July 6, 1920 |
| 1,468,148 | Gaess | Sept. 18, 1923 |
| 2,102,492 | Stolley | Dec. 14, 1937 |
| 2,127,639 | Breuer | Aug. 23, 1938 |
| 2,187,609 | Larson | Jan. 16, 1940 |
| 2,207,425 | Arbogast | July 9, 1940 |
| 2,360,563 | Harman | Oct. 17, 1944 |
| 2,502,879 | Nikander | Apr. 4, 1950 |
| 2,611,210 | Clark | Sept. 23, 1952 |
| 2,704,413 | Emery | Mar. 22, 1955 |
| 2,785,495 | Douglass | Mar. 19, 1957 |